Dec. 7, 1926.

E. PIQUEREZ

LUBRICANT FITTING

Filed April 16, 1925

1,609,425

Inventor
Emile Piquerez,
By Prince & Sweet
Attys.

Patented Dec. 7, 1926.

1,609,425

UNITED STATES PATENT OFFICE.

EMILE PIQUEREZ, OF PARIS, FRANCE, ASSIGNOR TO THE BASSICK MANUFACTURING COMPANY, OF CHICAGO, ILLINOIS, A CORPORATION OF DELAWARE.

LUBRICANT FITTING.

Application filed April 16, 1925, Serial No. 23,742, and in France August 1, 1924.

My invention relates to a simplified type of lubricant fitting useful in connection with pressure lubricating systems such as the well known "Tecalemit" system.

The basic feature of novelty involved is the elimination of the usual internal valve because the opening for passage of lubricant through the fitting is of small cross-section and relatively great length, so as to create, by surface friction on its walls, sufficient resistance to prevent the exit of lubricant.

The invention, therefore, involves the application of the principles of surface friction and viscosity to lubricant fittings; and is particularly advantageous for fittings for cycles and motorcycles or fittings for any machinery operating at moderate speeds.

The accompanying drawing shows, by way of illustration, two alternative constructions of a fitting according to the invention.

Figure 1:
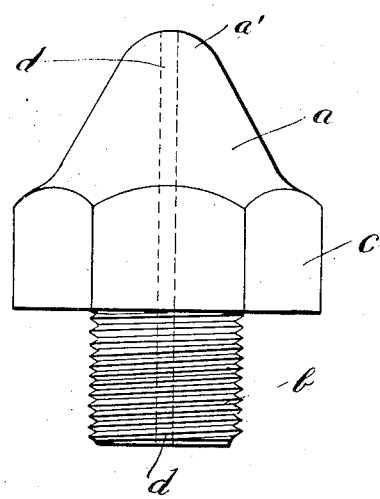
Fig. 1 is a side elevation of the first embodiment.

In the construction shown in Fig. 1, the body $a$ of the fitting has a generally conical shape and carries a threaded foot $b$ and a hexagonal head $c$ for fastening the same on the parts to be lubricated. The body $a$ preferably terminates in a sufficiently hemispherical portion $a^1$ appropriately shaped for engagement with the coupling connection, which connection may be of any suitable type such as that described in the French patent to Société Anonyme des Etablissements "Tecalemit" No. 583,793, of July 17, 1924.

The entire fitting $a$—$b$—$c$ is bored throughout its length by a passage $d$ of very small diameter and sufficient length to develop by friction on its walls sufficient resistance to prevent the exit of lubricant. Especially in case hard grease is to be used for the lubrication, it will be obvious that this will assure a practically complete closure of the fitting, with the same exposed.

Figure 2:
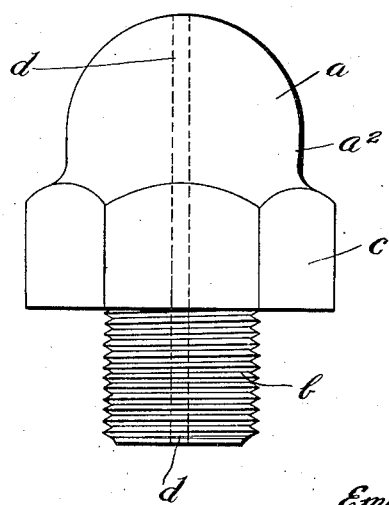
Fig. 2 is a similar side elevation of the second embodiment.

In the embodiment of Fig. 2 the body $a$ of the fitting has the general form of a hemispherical cap, which may merge directly into the hexagonal head $c$ or, as shown in the drawings, terminate a cylindrical portion $a^2$ rising from the head. The entire body $a$—$a^2$, head $c$ and foot $b$ are bored, as in the preceding embodiment, with a passage $d$ of very small cross-section and relatively great length.

It will be apparent that either the conical or cylindro-spherical form of fitting will make it possible to have a passage of small cross-section $d$ passing through the entire fitting of sufficient length to increase by a suitable ratio the surface friction developed along the walls of the passage.

Without further elaboration, the foregoing will so fully explain the gist of my invention, that others may, by applying current knowledge, readily adapt the same for use under various conditions of service, without eliminating certain features which may properly be said to constitute the essential items of novelty involved which items are intended to be defined and secured by the following claims:

1. A lubricant fitting comprising a body threaded to screw into a bearing to be lubricated, and an axial bore of small transverse area and comparatively great length, the diameter being such as to check return flow of lubricant injected into the bearings by the friction of the lubricant with the walls of the bore.

2. A lubricant fitting comprising a body and a small elongated passage through said body adapted to admit lubricant under high pressure from a gun, but checking return flow by the friction of the lubricant with the walls of the passage.

3. A lubricant fitting comprising a body having a threaded foot, a hexagonal portion above said foot, and a sealing portion, said body having a central axial bore of small diameter, the combined axial length of the body portions being sufficient to develop friction enough between the walls of the bore and the lubricant therein to prevent outward leakage of lubricant.

In witness whereof, I hereunto subscribe my name, this 23d day of March, 1925.

EMILE PIQUEREZ.